US007817290B2

(12) United States Patent
Klassen et al.

(10) Patent No.: US 7,817,290 B2

(45) Date of Patent: Oct. 19, 2010

(54) SYSTEM AND METHOD FOR TRANSMITTING ANALYZED IMAGE CONTENT INFORMATION FOR PRINT ENGINE CONTROL

(75) Inventors: R. Victor Klassen, Webster, NY (US); Norman W. Zeck, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1700 days.

(21) Appl. No.: 10/997,527

(22) Filed: Nov. 24, 2004

(65) Prior Publication Data

US 2006/0109499 A1 May 25, 2006

(51) Int. Cl.

| | |
|---|---|
| ***G06F 3/12*** | (2006.01) |
| ***H04N 1/60*** | (2006.01) |
| ***H04N 1/40*** | (2006.01) |
| ***G06T 5/00*** | (2006.01) |
| ***H04N 1/407*** | (2006.01) |

(52) U.S. Cl. .......................... 358/1.13; 399/38; 399/49; 358/1.9; 358/3.24; 358/3.26

(58) Field of Classification Search .................. 399/38, 399/49; 358/1.13, 1.9, 3.24, 3.26

See application file for complete search history.

(56) References Cited

U.S. PATENT DOCUMENTS

| | | | | |
|---|---|---|---|---|
| 4,649,500 | A | 3/1987 | Yamada et al. | |
| 4,843,426 | A | 6/1989 | Levine et al. | |
| 5,749,023 | A | 5/1998 | Grace et al. | |
| 5,887,221 | A * | 3/1999 | Grace | 399/49 |
| 6,029,023 | A | 2/2000 | Munemori | |
| 6,160,970 | A | 12/2000 | Scheuer et al. | |
| 6,177,948 | B1 * | 1/2001 | Estabrooks et al. | 347/129 |
| 6,223,006 | B1 | 4/2001 | Scheuer et al. | |
| 6,257,693 | B1 | 7/2001 | Miller | |
| 6,380,961 | B1 | 4/2002 | Van Der Loop et al. | |
| 6,462,833 | B1 * | 10/2002 | Claiborne | 358/1.16 |
| 6,580,879 | B2 | 6/2003 | Coleman et al. | |
| 6,870,547 | B1 * | 3/2005 | Crosby et al. | 345/619 |
| 2003/0164971 | A1 * | 9/2003 | Kidani et al. | 358/1.13 |
| 2003/0235421 | A1 | 12/2003 | Hooper et al. | |

FOREIGN PATENT DOCUMENTS

| | | |
|---|---|---|
| EP | 0915390 | 5/1999 |
| EP | 1339218 | 8/2003 |
| JP | 04107484 | 4/1992 |
| JP | 11084941 | 3/1999 |
| JP | 2001253124 | 9/2001 |

* cited by examiner

*Primary Examiner*—Twyler L Haskins
*Assistant Examiner*—Fred Guillermety
(74) *Attorney, Agent, or Firm*—Michael J. Nickerson; Basch & Nickerson LLP

(57) ABSTRACT

An image rendering system includes a digital front end to electronically analyze image data to generate geometry dependent image content information. A print engine, operatively connected to the digital front end, renders the image data. A print engine controller, operatively connected to the digital front end and the print engine, controls various parameters of the print engine. The digital front end transmits the image content information to the print engine controller. The print engine controller adjusts a parameter of the print engine based on the transmitted image content information. The transmitted image content information may be coverage information, reload information, and/or toner pile height information. The parameter of the print engine adjusted based upon the transmitted image content information may be fuser temperature and/or process speed of a developer housing and/or flow rate of toner into a developer housing.

3 Claims, 2 Drawing Sheets

| Byte | Value |
|---|---|
| 0 | N |
| 1 | Version |
| 2 | $Parameter_1$ |
| 3 | $Parameter_2$ |
| . . . | . . . |
| N-1 | $Parameter_{N-2}$ |

SYSTEM AND METHOD FOR TRANSMITTING ANALYZED IMAGE CONTENT INFORMATION FOR PRINT ENGINE CONTROL

BACKGROUND AND SUMMARY

In conventional systems, a digital front end or image input device produces raw raster image data which is transmitted to the print engine. While this raster image contains all the information needed to print the page, some further analysis is often required for optimal functioning of the print engine.

For example, in a conventional system, as illustrated in FIG. 1, a digital front end or image input device 10 may receive image data from an image source. This image data may be non-raster image data if it is coming from a computing device, or this image data may be raster image data if coming from a raster input scanning device. As noted above, the digital front end or image input device 10 produces raw raster image data.

This raw raster image data may be further processed by an image processing device or subsystem 20 so as to prepare the data for consumption by a rendering device in a print engine 30, such as a raster output scanning device, a laser, in a xerographic print engine. The print engine 30 renders the image data onto a medium to produce a hard copy thereof.

A typical xerographic print engine would include, as noted above, a raster output scanning device; a development subsystem; a transfer subsystem; a cleaning and re-charge subsystem; a fusing subsystem; and/or finishing subsystem.

The operations of the print engine 30 are conventionally controlled by a print engine controller 40. The print engine controller 40 may receive information relative to the image being rendered; such as pixel counts, toner consumption, etc.; from the image processing device 20 or feedback information from the print engine 30. This information is used by the print engine controller 40 to generate control signals that control the various operations of the various subsystems within the print engine 30.

An example of using information received by the print engine controller to generate control signals that control the various operations of the various subsystems within the print engine is disclosed in U.S. Pat. No. 4,649,500. U.S. Pat. No. 4,649,500 discloses a method for collecting data on the amounts of inks to be fed wherein the data being collected is useful in adjusting the feed amounts of the inks in a printing machine. As disclosed, printed pictures can be economically obtained by either on-line or off-line adjusting the ink fountains of the printing machine in accordance with the ink amount data. The entire content of U.S. Pat. No. 4,649,500 is hereby incorporated by reference.

Another example of using information received by the print engine controller to generate control signals that control the various operations of the various subsystems within the print engine is disclosed in U.S. Pat. No. 5,749,023. U.S. Pat. No. 5,749,023 discloses a method of compensating for toner cohesivity within a repository in a developer system by recording toner consumption rate and toner dispense rate over a given time within the developer system. A controller responds to the toner consumption and dispense rates over the given time period to compute toner residence time in the repository and estimate a degree of toner cohesiveness. The entire content of U.S. Pat. No. 5,749,023 is hereby incorporated by reference.

A further common example is the use of pixel counting. Pixel counting is used to determine toner or ink consumption. This information may be used by print engine controller to generate control signals that control the various operations of the various subsystems within the print engine.

In all the examples described above, the information provided to the print engine controller is typically generated as the print engine is writing the image. In the case of a xerographic printer, the information provided to the print engine controller is typically generated as the raster output scanning device is consuming the raster image data.

The generation of such data at this point in the process is too late with respect to controlling some of the parameters of the subsystems of the print engine that require sufficient lead time to make the appropriate adjustments. Examples of engine adjustments that need sufficient lead times may be, but are not limited to, reducing the process speed of a developer housing in response to low coverage, or changing the fuser temperature based on anticipated coverage.

In another example, the controlling some of the parameters of the subsystems of the print engine that require information from multiple pages must be known in advance to make the appropriate adjustments. Examples of parameters that require information from multiple pages be known in advance to make the appropriate adjustments may be, but are not limited to, potential for reload, degree of separation overlap (toner pile height), etc. This information may also require sufficient time to compute, making it difficult to generate in real time if it is generated as the print engine is writing the image.

Therefore, it may be desirable to provide an interface that allows the digital front end or image input device to compute and transmit additional side channel information, useful for engine controls. Moreover, it may be desirable to compute this information from a "thumbnail" image that is commonly computed already for other reasons. In addition, it may be desirable to provide information along with the image that is related to, but not be limited to: potential for reload or other artifacts, coverage information (possibly adjusted for IO1 effects), pile height information, and blank separations.

Since this information is computed before the image is transmitted to the print engine, any engine adjustments that are slow (such as reducing the process speed of a developer housing in response to low coverage, or changing the fuser temperature) may be made based on multiple successive pages' information. The engine control software knows which order the plates are imaged, so it is best able to combine information across pages.

A method of controlling a print engine from analyzed image content information electronically analyzes, prior to a print engine beginning to print an image, associated image data to generate image content information; transmits the image content information to a print engine controller; and adjusts a parameter of the print engine based on the transmitted image content information.

A method of controlling a print engine from analyzed image content information electronically analyzes image data to generate geometry dependent image content information; transmits the image content information to a print engine controller; and adjusts a parameter of the print engine based on the transmitted image content information.

An image rendering system includes a digital front end to electronically analyze non-raster image data to generate image content information; a print engine, operatively connected to the digital front end, to render the non-raster image data; and a print engine controller, operatively connected to the digital front end and the print engine, to control various parameters of the print engine. The digital front end transmits the image content information to the print engine controller. The print engine controller adjusts a parameter of the print engine based on the transmitted image content information.

BRIEF DESCRIPTION OF THE DRAWINGS

The drawings are only for purposes of illustrating embodiments and are not to be construed as limiting, wherein.

DETAILED DESCRIPTION

Figure 1:
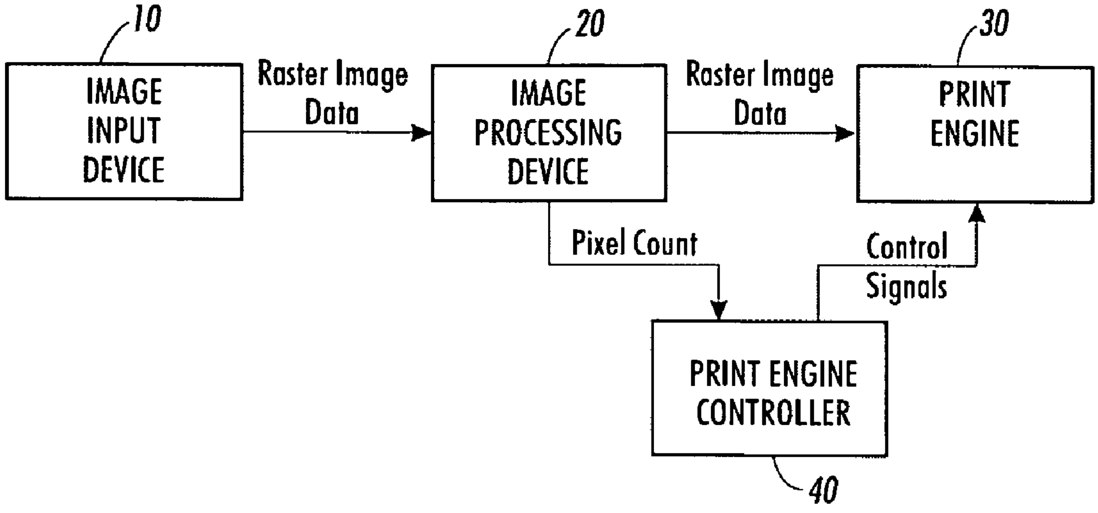
FIG. 1 (Prior Art)
FIG. 1 illustrates a block diagram of a conventional image rendering system.

For a general understanding, reference is made to the drawings. In the drawings, like references have been used throughout to designate identical or equivalent elements. It is also noted that the various drawings are not drawn to scale and that certain regions have been purposely drawn disproportionately so that the features and concepts could be properly illustrated.

As noted above, an interface allows the digital front end or image input device to compute and transmit additional side channel information, useful for engine controls. This information may be computed from a "thumbnail" image that is commonly computed already for other reasons. In addition, the information is passed along with the image. This information may be related to, but not be limited to: potential for reload or other artifacts, coverage information (possibly adjusted for image on image effects), pile height information, and blank separations.

Some of the transmitted information is inherently geometric in nature, despite being derived from a raster image. For example, per-separation coverage information is geometry-independent: it only depends on the sum of the coverage across an entire plate (or series of plates). On the other hand, pile height information depends on not only how much coverage there is, but where it appears. Moreover, it may be useful to know how maximum pile height varies across the page (side to side) or along the length of the page, so that fusing might be adjusted differentially across the page or between the start and end of the page. Similarly, reload information depends on where the toner appears, and not only its total amount. Finally, it may be advantageous to have a more geometric description of coverage so that toner feed might be adjusted from side to side of a page, or in several zones. All types of analyzed image information that depend on the location and not just the amount of the toner are geometry-dependent image information.

Since this information is computed before the image is transmitted to the print engine, any engine adjustments that are slow (such as reducing the process speed of a developer housing in response to low coverage, or changing the fuser temperature) may be made based on multiple successive pages' information. The engine control software knows in which order the plates are imaged, so it is best able to combine information across pages.

To address the situation of needing the information in a timely fashion to be effective in adjusting the print engine's parameters, a moderate amount of computation is performed by the digital front end or image input device in order to analyze the image data prior to printing, and pass this information to the engine control software in a compact form. This enables the engine control software to have access to the information for multiple pages in advance so that it may make decisions based on that information even when the engine cannot react rapidly As also noted above, a conventional system that provides side channel information useful for engine controls has the information computed from the raster image while the engine prints that image. This has several disadvantages.

Firstly, since the information is computed from the full image, it is more costly than computing it from a scaled down version (even if it is computed from a scaled down version, there is the additional cost of scaling it, since the thumbnail is not normally made available to the control software).

Secondly, multiple page information is not available when the feed forward information was computed from the raster image while the engine is printing that image.

Thirdly, some kinds of side channel information, such as toner pile height, and parameters affected by image-on-image printing, depend on values in multiple separations as they appear at the same location on the printed page. While they appear at the same place on the printed page, they are not rendered at the same time, but rather successively. Therefore computing information with cross-separation dependencies is inefficient when done at a point in the system where normally only one separation is available.

Fourthly, some kinds of side channel information, such as whether a separation is blank, have a variable computing cost. On a page that has a blank separation, a method for determining whether it is blank must look at the entire page, whereas the method could stop as soon as it found some non-blank image information when processing a non-blank page. Computing side channel information at the time the page is rendered requires that the processor that does so be fast enough to keep up with the worst case page, (in this case the blank page), while doing so earlier only requires that the processor be only slightly faster than able to keep up with the average case page (which has coverage before 10% of the page has been processed).

So if, for example, the nature of the image being printed indicates that the it would be appropriate to change the fuser temperature during rendering, such a change could effectively be realized because it typically takes two page cycles to effectively change the fuser roll temperature. Thus, using analyzed information that is computed from the raster image when the engine is already printing that image is not timely due to the physical constraints of the fuser roll, requiring for such a change to be effective, it requires two page cycles.

Furthermore, in the case of a blank separation, some energy savings may be had by not running certain engine components on such a separation (possibly only if there are several in a row). It is too late to make a determination not to run those components when the page is already being imaged.

Figure 2:
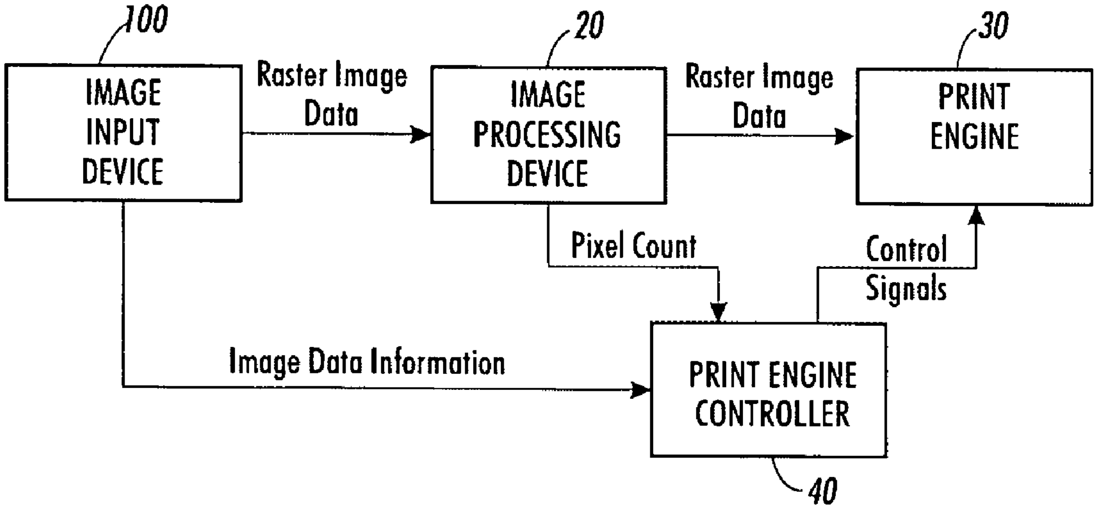
FIG. 2 is a block diagram of an image rendering system that includes transmitting analyzed image content information for print engine control.

To address this, a system as illustrated if FIG. 2, includes a digital front end or image input device 100 that computes such information before the image data is fed to a print engine. As illustrated in FIG. 2, a digital front end or image input device 100 may receive image data from an image source. This image data may be non-raster image data if it is coming from a computing device, or this image data may be raster image data if coming from a raster input scanning device. As noted above, the digital front end or image input device 100 produces raw raster image data as well as information for print engine control.

This raw raster image data may be further processed by an image processing device or subsystem 20 so as to prepare the data for consumption by a rendering device in a print engine 30, such as a raster output scanning device, a laser, or an LED bar in a xerographic print engine. The print engine 30 renders the image data onto a medium to produce a hard copy thereof.

A typical xerographic print engine would include, as noted above, a raster output scanning device; a development subsystem; a transfer subsystem; a cleaning and re-charge subsystem; a fusing subsystem; and/or finishing subsystem.

The operations of the print engine 30 are conventionally controlled by a print engine controller 40. The print engine controller 40 may receive information relative to the image being rendered; such as pixel counts, toner consumption, etc.; from the image processing device 20 or feedback information from the print engine 30. The print engine controller 40 may receive analyzed information relative to print engine control from the digital front end or image input device 100.

The analyzed image content information may include information relating to coverage information, reload information, and/or toner pile height information. This information is used by the print engine controller 40 to generate control signals that control and/or adjust the various operations and/or parameters of the various subsystems within the print engine 30.

It is noted that the digital front end or image input device 100 does not know the order in which separations are imaged, particularly in a system with a long, duplex paper path. (In such a paper path the first sides of some number of pages are printed and then the second side of the first of these pages is printed. The order in which these sides are printed is determined by the engine controller). So, while the digital front end or image input device 100 may determine information for multiple successive pages, since it has the wrong definition of "successive," it is best that the digital front end or image input device 100 compute page-independent information, summarized so as to minimize the additional computation needed, and let the engine control software of the print engine controller 40 combine multiple pages' information before deciding what to do.

The digital front end or image input device 100 may operate upon a thumbnail image at ⅛ of the resolution of the original resolution. The results of the image analysis can be represented in the form of a small collection of numbers, as illustrated in FIG. 4.

Figures 3, 4:
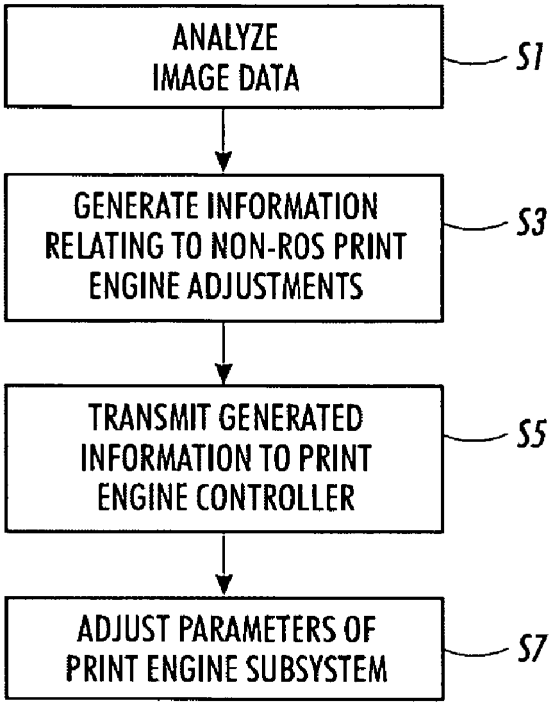
FIG. 3 illustrates a flowchart for transmitting image content information for print engine control.
FIG. 4 illustrates a byte template for transmitting image content information for print engine control.

For example, the information would be passed in the form of a variable-length structure as illustrated in FIG. 4. This allows maximum flexibility for future expansion as new parameters are added. The version number provides the mechanism by which changes to the interpretation of existing parameters may be coordinated between the sending and receiving ends; the byte count field makes it possible for intermediate processes to pass the data with no knowledge of its contents. It is also possible to encode only the information needed in a few bytes of data of fixed length: 32-bits coverage, four or more bits for reload, eight or more bits of toner thickness, with the remaining bits reserved for future use.

In other words there may be different forms of the information to be passed to the print engine controller. For example, if the function is to provide information for toner dispense rates, the information computed might be the total coverage, expressed as an eight bit fraction (255 meaning full coverage; 0 meaning no coverage), for each separation. In another example, if the function is to provide information for adjusting the magnetic roll speed (full speed if there is potential for a reload artifact; reduced speed otherwise), the information might be as compact as one bit per separation. In a further example, if the function is to provide information for transfer, it might be the maximum average toner thickness over tiles within the image of some desired size. In yet another example, it might even be the maximum average toner thickness over such tiles within each of several regions in the page.

As illustrated in FIG. 3, image data, such as non-raster image data is analyzed at Step S1. As noted before, the digital front end or image input device may operate upon a thumbnail image. This analysis is done early enough in the rendering process to allow the print engine controller to generate control signals to effectively control the desired parameters of the various subsystems of the print engine.

At Step S3, information relating to print engine adjustments is generated. This information may be related to non-raster output scanning device print engine adjustments; such as fuser temperature or process speed of a developer housing. The information, at Step S5, is transmitted to the print engine controller. Thereafter, at Step S7, the print engine controller generates signals to effectively control or adjust the desired parameters of the various subsystems of the print engine.

To better understand the use of analyzed image content information for print engine control, the situation with respect to addressing the potential for a reload artifact will be discussed below.

To understand the reload artifact problem, it is useful to understand the toner development process with respect to a hybrid scavengeless development developer apparatus. Hybrid scavengeless development technology deposits toner onto the surface of a donor roll via a conventional magnetic brush. The donor roll generally consists of a conductive core covered with a thin (50-200 micron) partially conductive layer. The magnetic brush roll is held at an electrical potential difference relative to the donor core to produce the field necessary for toner development. Applying an AC voltage to one or more electrode wires spaced between the donor roll and the imaging belt provides an electric field which is effective in detaching toner from the surface of the donor roll to produce and sustain an agitated cloud of toner particles about the wires, the height of the cloud being such as not to be substantially in contact with the belt. Typical AC voltages of the wires relative to the donor are 700-900 Vpp at frequencies of 5-15 kHz and may be applied as square waves, rather than pure sinusoidal waves. Toner from the cloud is then developed onto the nearby photoreceptor by fields created by a latent image. However, in another embodiment of the hybrid system, the electrode wires may be absent. For example, a hybrid jumping development system may be used wherein an AC voltage is applied to the donor roll, causing toner to be detached from the donor roll and projected towards the imaging member surface.

The hybrid scavengeless development developer apparatus includes a reservoir containing developer material. The developer material may be either of the one component or two component type. For purposes of discussion, developer material is of the two component type, that is it comprises carrier granules and toner particles; however, it should be appreciated that single component developer may also be used. The two-component developer material may be of any suitable type. The use of an electrically conductive developer can eliminate the possibility of charge build-up within the developer material on the magnetic brush roll, which, in turn, could adversely affect development at the second donor roll. In one embodiment, the two-component developer consists of 5-15 micron insulating toner particles, which are mixed with 50-100 micron conductive magnetic carrier granules such that the developer material includes from about 90% to about 99% by weight of carrier and from 10% to about 1% by weight of toner. By way of example, the carrier granules of the developer material may include a ferromagnetic core having a thin layer of magnetite overcoated with a non-continuous layer of resinous material. The toner particles may be made from a resinous material, such as a vinyl polymer, mixed with a coloring material.

The reservoir includes augers, which are rotatably-mounted in the reservoir chamber. Augers serve to transport and to agitate the material within the reservoir and encourage the toner particles to charge and adhere triboelectrically to the carrier granules. A magnetic brush roll transports developer material from the reservoir to loading nips of donor rolls. The magnetic brush rolls includes a rotatable tubular housing within which is located a stationary magnetic cylinder having a plurality of magnetic poles impressed around its surface. The carrier granules of the developer material are magnetic and, as the tubular housing of the magnetic brush roll rotates, the granules (with toner particles adhering triboelectrically thereto) are attracted to the magnetic brush roll and are conveyed to the donor roll loading nips. A metering blade removes excess developer material from the magnetic brush roll and ensures an even depth of coverage with developer material before arrival at the first donor roll loading nip.

At each of the donor roll loading nips, toner particles are transferred from the magnetic brush roll to the respective donor roll. The carrier granules and any toner particles that remain on the magnetic brush roll are returned to the reservoir as the magnetic brush continues to rotate. The relative amounts of toner transferred from the magnetic roll to the donor rolls can be adjusted, for example by: applying different bias voltages to the donor rolls; adjusting the magnetic to donor roll spacing; adjusting the strength and shape of the magnetic field at the loading nips and/or adjusting the speeds of the donor rolls.

Each donor roll transports the toner to a respective development zone through which a photoconductive belt passes. At each of the development zones, toner is transferred from the respective donor roll to the latent image on the belt to form a toner powder image on the latter. Various methods of achieving an adequate transfer of toner from a donor roll to a latent image on an imaging surface are known and any of those may be employed at the development zones. Transfer of toner from the magnetic brush roll to the donor rolls can be encouraged by, for example, the application of a suitable D.C. electrical bias to the magnetic brush and/or donor rolls. The D.C. bias (for example, approximately 70 volts applied to the magnetic roll) establishes an electrostatic field between the donor roll and magnetic brush rolls, which causes toner particles to be attracted to the donor roll from the carrier granules on the magnetic roll.

Each of the development zones has a pair of electrode wires disposed in the space between each donor roll and belt. The electrode wires may be made from thin (for example, 50 to 100 micron diameter) stainless steel wires closely spaced from the respective donor roll. The wires are self-spaced from the donor rolls by the thickness of the toner on the donor rolls and may be within the range from about 5 micron to about 20 micron (typically about 10 micron) or the thickness of the toner layer on the donor roll.

For each of the donor rolls, the respective electrode wires extend in a direction substantially parallel to the longitudinal axis of the donor roll. An alternating electrical bias is applied to the electrode wires by an AC voltage source. The applied AC establishes an alternating electrostatic field between each pair of wires and the respective donor roll, which is effective in detaching toner from the surface of the donor roll and forming a toner cloud about the wires, the height of the cloud being such as not to be substantially in contact with belt. The magnitude of the AC voltage in the order of 200 to 500 volts peak at frequency ranging from about 8 kHz to about 16 kHz. A DC bias supply, applied to each donor roll, establishes electrostatic fields between the photoconductive belt and donor rolls for attracting the detached toner particles from the clouds surrounding the wires to the latent image recorded on the photoconductive surface of the belt.

After development, excess toner may be stripped from donor roll by respective cleaning blades so that magnetic brush roll meters fresh toner to the clean donor rolls. As successive electrostatic latent images are developed, the toner particles within the developer material are depleted. A developer dispenser stores a supply of toner particles, with or without carrier particles. The dispenser is in communication with reservoir and, as the concentration of toner particles in the developer material is decreased (or as carrier particles are removed from the reservoir as in a “trickle-through” system or in a material purge operation as discussed below), fresh material (toner and/or carrier) is furnished to the developer material in the reservoir. The auger in the reservoir chamber mixes the fresh material with the remaining developer material so that the resultant developer material therein is substantially uniform with the concentration of toner particles being optimized. In this way, a substantially constant amount of toner particles is in the reservoir with the toner particles having a constant charge. Developer housing may also include an outlet for removing developer material from the housing in accordance with a developer material purge operation as discussed in detail below. The outlet may further include a regulator (not shown) such as an auger or roller to assist in removing material from the housing.

Various sensors and components within developer apparatus are in communication with a system controller, which monitors and controls the operation of the developer apparatus to maintain the apparatus in an optimal state. In addition to voltage source, donor rolls, magnetic brush roll, augers, dispenser, and outlet, the system controller may, for example, communicate with a variety of sensors, including, for example, sensors to measure toner concentration, toner charge, toner humidity, the voltage bias of the developer material, bias of the magnetic brush roll, and the bias of the donor roll.

Each donor roll rotates and when it completes a full rotation, the donor roll has toner with a different charge/mass ratio than in regions where the toner has been on the roll for multiple revolutions. In particular, the developability may be less for toner in regions of the roll where toner was removed during the previous revolution. This leads to the possibility of a reload artifact, which appears as a light area in the later region.

Part of the source of the problem is the speed of rotation of the magnetic roll. While high area coverage jobs need the magnetic roll to transfer toner continuously from the supply system to the donor rolls, low area coverage jobs do not, and the toner churning caused by the continuous motion of the magnetic roll prematurely ages the toner, which causes it to be more prone to reload artifacts. The exact details of the physical processes involved are not relevant to this discussion. It is sufficient to say that there is a part of the printing system which, if slowed down, will make reload worse when it happens and if left at full running speed, will make reload happen sooner (i.e., the developer materials will reach a state conducive to reload sooner).

In some electrophotographic configurations the problem is complicated further by having two donor rolls, where each donor roll rotates at a different speed. In this situation, the reload artifact will cause one discontinuity at one distance (for example, 51 mm, and possibly at multiples of 51 mm, say 104 mm) after a discontinuity in image content, corresponding to the length of rotation of the first donor roll. There will also be another discontinuity at a second distance (for example, about 63 mm and possibly at multiples thereof, say 126 mm) corresponding to the length of rotation of the second donor roll.

An example of a type of image which may produce a reload artifact found in many documents is a page containing a horizontal stripe in landscape mode. This stripe may be related to the identity of the customer and contain a logo. A stripe can be any graphic element that is relatively strong in toner concentration, limited in height, and spanning a significant width of the page in landscape mode. PowerPoint slides often contain such stripes. Typically the remainder of the page will contain a constant mid-grey with a moderate amount of content (e.g., a graph). A reload artifact will be present in the form of a "shadow" of the stripe that appears in the mid-grey region. In a long-edge feed system (or two-up short edge feed), a horizontal stripe on a portrait mode page will interfere with itself in a similar manner.

The following definitions are useful in characterizing the reload artifact problems. Source is a location on the page where toner might be removed from the donor roll, causing reload at some later position on the page. Source object is a character, graphical object or image or portion thereof whose pixels act as the source. Destination is a location a fixed distance later on the page than the corresponding source. Typically the fixed distance is a function of the circumference of the donor roll. Minimum source coverage is a digital value defining the amount of toner deposited over a local area at the source, only sufficient that for some destination coverage value, reload will occur. Minimum destination coverage is a digital value defining the amount of toner requested to be deposited over a local area at the destination only sufficient that for some source coverage value, reload will occur. One might expect that the minimum destination coverage would depend on the source coverage, but it appears to have limited dependence. Critical source dimension is the (one dimensional) minimum size over which the minimum source coverage must be maintained before reload will be visible. The other dimension is assumed to have infinite size. Critical destination dimension is the (one dimensional) minimum size over which the minimum destination coverage must be maintained before reload will be visible.

There are several reasons why a reload artifact might not be visible (even if the system were to produce it). First, the amount of toner replaced on the donor roll might be small; this may occur when the source object is rendered with a light tint, or when the source object has very little spatial extent. Either the source is less than the minimum source coverage, or the source object is smaller than the critical source dimension. Second, the amount of toner needed at the destination may be small enough that the reduced developability of the toner on the roll does not reduce the amount of toner by enough to be visible ($\Delta E<0.2$). Third, there might be enough reload that it would be visible except that the high spatial frequency content at the destination masks the moderate errors in lightness. This may happen when the destination is a scanned image, except in the smoothest parts, or when the destination is text smaller than about 30 points. It does not matter whether the reload is not visible due to masking in the human visual system or due to there being enough toner that the artifact is too small to be visible without masking.

The forgoing can be summarized: if the source object has more than the minimum source coverage, it may cause reload. Whether the source object causes reload also depends on whether it exceeds the critical source dimension. If the destination has more than the minimum destination coverage, it may exhibit reload. To exhibit reload, the destination object must also be larger than the critical destination dimension. If there is sufficient high frequency (or edge) information, the destination will not exhibit reload. It is noted that, at least to first order, there is no effect of orientation on reload potential.

An exemplary reload potential detection method operates by passing through a reduced resolution image looking for locations where there is more than the minimum source level, the appropriate number of scan lines before a location where there is more than the minimum destination level. Locations meeting that criterion are then checked for high spatial frequency content (for example, by using a simple edge detection filter), and if they lack high spatial frequencies, they may then be checked for neighbors that have also passed these tests. Where enough neighbors are found, the pixel is considered to have reload potential, and that separation of the image is flagged as having reload potential.

In this exemplary implementation, if a pixel has sufficient coverage to be a reload-causing source, then its neighborhood is considered, and if all neighbors have sufficient coverage, then that fact is stored. The right distance later, if the corresponding pixel has enough coverage to be a reload-exhibiting destination, (only considering pixels with corresponding reload-causing sources), then its neighborhood is considered. Here, a check for the entire neighborhood having sufficient coverage is made, and that its edge content is low. At this point it is tentatively reload-causing. The next step is to look at any tentatively reload-causing pixel, and check its neighborhood. If they are tentatively reload-causing as well, the method is done, a reload-causing pixel has been found. The portion where neighboring pixels are checked to see whether they are tentatively reload-causing could be done by building a Boolean map (of results), where a location in the map is true if the corresponding pixel is reload causing, and then forming the logical AND of all locations in a neighborhood, thereby combining the neighboring results. Other implementations are possible.

The exemplary method uses a reduced resolution image, where the resolution is selected so that the minimum feature width corresponds to approximately three pixels wide. In an alternative embodiment the image might use a higher resolution image, including a full resolution image, in which case the neighborhoods used in the various tests would be correspondingly larger. In yet another embodiment, only a portion of the image might be used. For example, if a document is printing on a template, only the variable data portion need be examined since the template portion of the document is the same for each page. In such an embodiment, a reduced amount of data would be retained for the template portion, indicating which portions of the template might cause reload in the variable portion, and which portions might exhibit reload caused by the variable portion. At a later time (i.e., page assembly time), the variable portion would be checked to determine whether it would produce reload in the previously examined template portion, or exhibit reload due to the data found in the previously examined template portion.

For each separation (typically four), a ring buffer of prior scan lines is stored. The nth scan line in the ring buffer (counting from 0) contains the nth previous scan line to the one currently being examined for reload. These are referred to as the history buffers. A buffer of one Boolean value per separation per scan line may be used to indicate which scan lines have at least one pixel with the potential to cause reload. These buffers are referred to as the hot buffers. They are only used for efficiency. For each separation, at least one scan line of detection results is maintained, to provide a larger context than the current scan line's results. These are known as the reload buffers.

The methodology discussed above will be set forth in more detail. At the start of each page, history buffers are initialized with the assumption that there are control patches (patches used by the printer control software to maintain calibration) in the space immediately preceding the lead edge of the document. Control patches do not exhibit, but might produce, a reload artifact one rotation later. A row counter is set to 0. This counter is used to indicate the row within the page currently being processed. Then, a determination is made as to whether the last row of the current page has just been processed. This may be done, e.g., by comparing the row counter to the number of rows in a page.

If the last row has not been processed, a next scanline is read, received, or otherwise obtained. Then, the result for this row is initialized to false. Optionally, the coverage level for the next scanline is calculated. This may be done, e.g., by summing the values of the pixels in the next scanline. Then, the history buffer is checked for reload potential. If reload potential is found, the result for this row is set to true. If coverage is not being computed, processing for this page may be stopped when reload potential is found. If processing does not stop, the next scanline is added to the history buffer, values are set in the hot buffer, the value of row is increased by one, the ring buffers are advanced by one. Ring buffers are well known in the art: when a ring buffer is advanced, the entry that was at position i becomes the new entry at position i+1.

If the last row has just been processed and if coverage is computed, the value of coverage over the entire page is reported, as well as a single Boolean value indicating whether reload potential was found anywhere on the page.

The following is a further discussion of the initialization. The portion of the ring buffer corresponding to where the control patches would be is set to full ON, since the actual values in the control patches is not known a priori. Other portions are initialized to 0. The hot buffers are set to true for those scanlines which are not zero in the corresponding history buffer. The reload buffers are initialized to false (no reload) for all pixels, scan lines and separations.

A variable j is set to zero. This variable indicates the scanline within the ring buffers. The variable j is compared with N, the number of lines in the ring buffers. If j does not equal the number of lines in the ring buffers, the jth element of the array HotBuffer is set to false. This means that no marking material has been called for (so far) in the jth row of the ring buffer. Then a variable i is set to zero. This variable indicates the pixel within the current scanline. The variable i is compared with the number of pixels in a scanline. If j is the same as the number of pixels in a scanline, i is increased by one. If j is not the same as the number of pixels in a scanline, a determination is made whether location (i,j) is within the region of a control patch. This is done by comparing the location to a known set of locations where control patches may be located.

If the location is within the region of a control patch, location (i,j) in the ring buffer is set to 1 (full on), and the jth element of the array HotBuffer is set to true; location (i,j) in the ring buffer is set to 0. Thereafter, the (i,j) location in the reload buffer is set to false. Finally, j is incremented.

A determination is made whether the element in the array HotBuffer corresponding to the current scanline is true. It is true if and only if there was at least one pixel with a value greater than srcMin in a scanline either echo1 or echo2 before the current scanline. If the element in the array HotBuffer corresponding to the current scanline is false, no reload is possible for this scanline, and processing continues with the next scanline. Otherwise, j is assigned a value 1. The variable j indicates which pixel is being considered, and j=1 corresponds to the second pixel in. In this way, a three by three neighborhood of the current pixel may be examined. It should be appreciated that if a larger neighborhood is to be examined, the initial value of j should be set to a correspondingly larger value.

A determination is made whether the current pixel has a value greater than DestMin. If it does, the region surrounding the pixel in the history buffer at column j, and a row corresponding to a distance echo1 before the current scanline is examined. In this examination, the pixel with the minimum value in the neighborhood is found. In this embodiment, a 3×3 neighborhood is examined, i.e., all immediate neighbors of the pixel at column j and echo1 before the current scanline. However, it should be obvious to one versed in the art that a larger neighborhood could be examined. If any of the neighbors so examined has a value less than srcMin, the neighborhood is not entirely contained in a sufficiently large region of pixels greater than srcMin for reload to occur. If the minima of both neighborhoods are sufficiently large, the edge content of the current pixel is tested.

This method may use any of the many edge detection methods in the art. Such methods provide a measure of edge content, which is relatively close to zero if there is no edge in the vicinity of a pixel, and relatively large, if there is an edge or high frequency noise. The edge measure is compared with a threshold, to determine whether there is enough edge content that reload, if present, would not be visible. If the edge content is not above the threshold, the reload buffer is set to true for this pixel. This indicates that there might be a reload problem at this pixel. A pixel continues to be considered to have reload potential if its neighbors to the right and to the left have reload potential, and if its neighbor in the previous scanline has reload potential.

After all scan lines have been processed, the average coverage on the entire page (for each separation) and a single bit per separation indicating whether potential reload artifacts are identified and reported. These may be used in the feed forward process described above, such as by using this information to slow down the magnetic roll, thereby increasing developer materials life. Alternatively the information might be reported to the customer to allow them to alter the page, to make it less likely to have reload potential.

In summary, an image rendering system includes a digital front end to electronically analyze image data to generate geometry dependent image content information. An electrophotographic print engine renders the image data. A print engine controller controls various parameters of the electrophotographic print engine. The digital front end transmits the image content information to the print engine controller. The print engine controller adjusts a parameter of the electrophotographic print engine based on the transmitted image content information. The transmitted image content information may be coverage information, reload information, and/or toner pile height information. The parameter of the electrophotographic print engine adjusted based upon the transmitted image content information may be fuser temperature and/or process speed of a developer housing and/or flow rate of toner into a developer housing.

While various examples and embodiments have been shown and described, it will be appreciated by those skilled in the art that the spirit and scope of the descriptions are not limited to the specific description and drawings herein, but extend to various modifications and changes.

What is claimed is:

1. A method of controlling an electrophotographic print engine, having a plurality of subsystems for enabling rendering of image data, from analyzed image content information, comprising:

(a) electronically analyzing, prior to the electrophotographic print engine beginning to print an image, associated image data to generate image content information, the generated image content information including coverage information, potential reload artifact information, and toner pile height information, the toner pile height information specifying locations of toner pile heights within the page;

(b) transmitting the image content information to a print engine controller;

(c) generating a process speed control signal based on the transmitted image content information, the process speed control signal controlling a speed of a magnetic brush roll of a hybrid scavengeless development developer subsystem within the electrophotographic print engine;

(d) generating a temperature fuser control signal based on the transmitted image content information, the temperature fuser control signal differentially controlling a temperature of a fuser, within the electrophotographic print engine, across a page being rendered and differentially controlling a temperature of the fuser, within the electrophotographic print engine, between a start and an end of the page being rendered; and (e) generating a toner flow rate control signal based on the transmitted image content information, the toner flow rate control signal controlling a rate of flow of toner in the hybrid scavengeless development developer subsystem.

2. The method as claimed in claim 1, wherein the associated image data is a thumbnail image.

3. An image rendering system, comprising:

a digital front end to electronically analyze image data to generate geometry dependent image content information, the generated geometry dependent image content information including coverage information, potential reload artifact information, and toner pile height information, the toner pile height information specifying locations of toner pile heights within the page;

a print engine, operatively connected to said digital front end, to render the image data, said print engine having a plurality of subsystems for enabling rendering of image data; and a print engine controller, operatively connected to said digital front end and said print engine, to generate control signals, the control signals controlling operations of the subsystems within the print engine;

said digital front end transmitting the generated geometry dependent image content information to said print engine controller;

said print engine controller controlling a speed of a magnetic brush roll of a hybrid scavengeless development developer subsystem within said print engine based on the transmitted geometry dependent image content information;

said print engine controller, based on the transmitted geometry dependent image content information, differentially controlling a temperature of a fuser within said print engine across a page being rendered and differentially controlling a temperature of the fuser within said print engine between a start and an end of the page being rendered;

said print engine controller, based on the transmitted geometry dependent image content information, controlling a rate of flow of toner in the hybrid scavengeless development developer subsystem.

* * * * *